United States Patent
Merlin et al.

(10) Patent No.: US 9,113,500 B2
(45) Date of Patent: Aug. 18, 2015

(54) DEVICE AND METHOD FOR COMMUNICATION OF MANAGEMENT INFORMATION IN AD-HOC WIRELESS NETWORKS

(75) Inventors: Simone Merlin, San Diego, CA (US); Santosh P. Abraham, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 156 days.

(21) Appl. No.: 13/543,211

(22) Filed: Jul. 6, 2012

(65) Prior Publication Data

US 2013/0176901 A1 Jul. 11, 2013

Related U.S. Application Data

(60) Provisional application No. 61/506,134, filed on Jul. 10, 2011, provisional application No. 61/506,267, filed on Jul. 11, 2011.

(51) Int. Cl.
| | |
|---|---|
| *H04L 12/28* | (2006.01) |
| *H04W 4/00* | (2009.01) |
| *H04W 84/18* | (2009.01) |
| *H04W 28/06* | (2009.01) |
| *H04W 48/08* | (2009.01) |
| *H04W 48/16* | (2009.01) |

(52) U.S. Cl.
CPC .............. *H04W 84/18* (2013.01); *H04W 28/06* (2013.01); *H04W 48/08* (2013.01); *H04W 48/16* (2013.01)

(58) Field of Classification Search
CPC ...................................................... H04L 45/02
USPC .................................................. 370/255, 338
See application file for complete search history.

(56) References Cited

U.S. PATENT DOCUMENTS

| | | | |
|---|---|---|---|
| 6,694,359 | B1 | 2/2004 | Morris et al. |
| 7,224,673 | B1 | 5/2007 | Leung et al. |
| 7,602,754 | B2 | 10/2009 | Heinonen et al. |

(Continued)

FOREIGN PATENT DOCUMENTS

| | | |
|---|---|---|
| EP | 1720276 A1 | 11/2006 |
| JP | 2009533954 A | 9/2009 |

(Continued)

OTHER PUBLICATIONS

Stoeckigt et al., VOIP Capacity Analysis in 802.11 WLAN, Oct. 2009, ALL.*

(Continued)

*Primary Examiner* — Omar Ghowrwal
*Assistant Examiner* — Angel Brockman
(74) *Attorney, Agent, or Firm* — S. Hossain Beladi

(57) ABSTRACT

A method includes detecting, by a first device, a beacon sent from a second device. The beacon is associated with an ad-hoc wireless network. In response to detecting the beacon, the first device sends to the second device a request for management information associated with the ad-hoc wireless network. The request identifies at least a first information element associated with at least a first portion of the management information and a second information element associated with at least a second portion of the management information. The method further includes receiving from the second device a first wrapper information element that includes at least the first information element.

16 Claims, 9 Drawing Sheets

(56) References Cited

U.S. PATENT DOCUMENTS

| | | |
|---|---|---|
| 8,855,099 B2 | 10/2014 | Kitazoe et al. |
| 2003/0081557 A1 | 5/2003 | Mettala et al. |
| 2005/0111403 A1 | 5/2005 | Rudolf et al. |
| 2005/0177639 A1 | 8/2005 | Reunamaki et al. |
| 2006/0040701 A1* | 2/2006 | Long et al. .................. 455/525 |
| 2006/0067214 A1 | 3/2006 | Ramachandran |
| 2006/0171348 A1 | 8/2006 | Nokano et al. |
| 2006/0172742 A1 | 8/2006 | Chou et al. |
| 2006/0268749 A1 | 11/2006 | Rahman et al. |
| 2007/0201397 A1 | 8/2007 | Zhang |
| 2007/0242643 A1* | 10/2007 | Chandra et al. ............. 370/338 |
| 2007/0294758 A1 | 12/2007 | Berg et al. |
| 2008/0086560 A1* | 4/2008 | Monier et al. ............... 709/224 |
| 2008/0151796 A1 | 6/2008 | Jokela |
| 2008/0198816 A1 | 8/2008 | Kats et al. |
| 2009/0034729 A1 | 2/2009 | Brown et al. |
| 2009/0135784 A1 | 5/2009 | Horn et al. |
| 2010/0103831 A1 | 4/2010 | Caldwell et al. |
| 2010/0146129 A1 | 6/2010 | Nakahara |
| 2010/0157955 A1 | 6/2010 | Liu et al. |
| 2010/0211806 A1 | 8/2010 | Diab et al. |
| 2010/0226315 A1* | 9/2010 | Das et al. .................... 370/328 |

FOREIGN PATENT DOCUMENTS

| | | |
|---|---|---|
| KR | 20090007314 A | 1/2009 |
| WO | 2004086681 A2 | 10/2004 |
| WO | 2006120533 A2 | 11/2006 |
| WO | 2007057035 A1 | 5/2007 |
| WO | 2008072005 A2 | 6/2008 |
| WO | WO-2008116128 | 9/2008 |
| WO | 2009115991 A1 | 9/2009 |
| WO | 2009122697 A1 | 10/2009 |
| WO | 2009150777 A1 | 12/2009 |
| WO | 2010103758 A1 | 9/2010 |

OTHER PUBLICATIONS

International Search Report and Written Opinion—PCT/US2012/045991—ISA/EPO—Jan. 22, 2013.

* cited by examiner

DEVICE AND METHOD FOR COMMUNICATION OF MANAGEMENT INFORMATION IN AD-HOC WIRELESS NETWORKS

I. CROSS-REFERENCE TO RELATED APPLICATIONS

The present application claims priority from and the benefit of U.S. Provisional Patent Application No. 61/506,134, filed Jul. 10, 2011, and also claims priority from and the benefit of U.S. Provisional Patent Application No. 61/506,267, filed Jul. 11, 2011.

II. FIELD

The present application is related generally to ad-hoc wireless networks and more particularly to devices and methods for communication of management information in ad-hoc wireless networks.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process instructions, such as a web browser application that can be used to access the Internet. Memories, such as a memory within a wireless telephone or other electronic device, may store instructions in addition to other data.

Mobile devices may communication directly with each other via ad-hoc wireless networks. To set up or to operate an ad-hoc wireless network, mobile devices may refer to management information, which may be sent by an access point or by another mobile device. Based on the management information, the mobile devices can decide whether to join the ad-hoc wireless network and how to exchange communications within the ad-hoc wireless network. However, communication of the management information can compete with communication of user data, thus reducing performance of the ad-hoc wireless network.

IV. SUMMARY

Some ad-hoc wireless networks send management information (e.g., an indication of network bandwidth) during a predefined interval that is reserved for network management. However, reserving such an interval for sending the management information can consume network resources, reducing data rates and slowing performance of the ad-hoc wireless network. Further, the interval may not be responsive to devices joining or leaving the ad-hoc wireless network and therefore may have a duration too long or too short for the number of devices in the ad-hoc wireless network. According to other techniques, instead of periodically sending the management information, the management information is sent in response to a "probe" request from a mobile device. However, a mobile device may use only a subset of the information sent. Thus, such techniques may still result in poor allocation of network resources by communicating unneeded information.

An ad-hoc wireless network in accordance with the present disclosure may utilize a "poll" request that identifies particular information elements (IEs) corresponding to management information. The ad-hoc wireless network may further utilize a management wrapper frame that is an IE designed to "wrap" (e.g., contain) other IEs. According to a particular example operation, a first device polls a second device for a set of particular IEs (e.g., by sending a poll request that includes indices corresponding to the set of IEs). The second device may determine whether the set of IEs can be contained within a first wrapper IE. If the set of IEs can be contained within the first wrapper IE, then the second device may send the set of IEs to the first device in the first wrapper IE. If, however, the set of IEs cannot be contained within the first wrapper IE, then the second device may send a subset of the IEs to the first device in the first wrapper IE and may send the remainder of the set of IEs to the first device in a second wrapper IE. In at least one embodiment, the subset is selected such that none of the particular IEs is fragmented between (e.g., spread across) the first wrapper IE and the second wrapper IE, which may enable the first device to use the IEs of the first wrapper IE without waiting to receive the second wrapper IE.

Alternatively or in addition, devices of the ad-hoc wireless network may exchange a "short request" and a "generic management wrapper frame" that are each associated with predetermined management information. For example, the short request and the generic management wrapper frame may be associated with an address of an access point of the ad-hoc wireless network. After exchanging the short request and the generic management wrapper frame, a standard-length request and a non-generic management wrapper frame can be exchanged between the devices.

According to another particular illustrative embodiment, a method includes receiving a request from a first device. The request identifies management information associated with an ad-hoc wireless network, and the management information corresponds to a set of information elements. The method further includes determining whether the set of information elements can be contained within a first wrapper information element. If the set of information elements can be contained within the first wrapper information element, the first wrapper information element is sent, where the first wrapper information element includes the set of information elements. If the set of information elements cannot be contained within the first wrapper information element, a subset of the set of information elements that can be contained within the first wrapper information element is selected and the first wrapper information element is sent, where the first wrapper information element includes the subset of the set of information elements.

According to another particular illustrative embodiment, a method includes detecting, by a first device, a beacon sent from a second device. The beacon is associated with an ad-hoc wireless network. In response to detecting the beacon, the first device sends to the second device a request for management information associated with the ad-hoc wireless network. The request identifies at least a first information element associated with at least a first portion of the management information and a second information element associated with at least a second portion of the management information. The method further includes receiving from the second device a first wrapper information element that includes at least the first information element.

According to another particular illustrative embodiment, a method includes receiving a short request from a first device. The short request is associated with one or more predetermined information elements. In response to receiving the short request, a generic wrapper information element that includes the one or more predetermined information elements is sent. The method further includes receiving from the first device a standard-length request. The standard-length request identifies at least a second information element not included in the generic wrapper information element. In response to receiving the standard-length request, a non-generic wrapper information element that includes at least the second information element is sent.

According to another particular illustrative embodiment, a method includes receiving by a first device a beacon from a second device. The beacon is associated with an ad-hoc wireless network. The method further includes sending to the second device a short request. The short request is associated with one or more predetermined information elements associated with the ad-hoc wireless network. A generic wrapper information element that includes the one or more predetermined information elements is received from the second device. The method further includes sending to the second device a standard-length request. The standard-length request identifies at least a second information element not included in the generic wrapper information element. A generic wrapper information element that includes at least the second information element is received from the second device.

According to another particular illustrative embodiment, an apparatus includes a memory and a processor coupled to the memory. The processor detects a beacon sent from a second device. The beacon is associated with an ad-hoc wireless network. In response to detecting the beacon, the processor sends to the second device a request for management information associated with the ad-hoc wireless network. The request identifies at least a first information element associated with at least a first portion of the management information and a second information element associated with at least a second portion of the management information. The processor receives from the second device a first wrapper information element. The first wrapper information element includes the first information element.

According to another particular illustrative embodiment, a computer-readable non-transitory storage medium is encoded with instructions. The instructions are executable by a processor to detect a beacon sent from a second device. The beacon is associated with an ad-hoc wireless network. The instructions are further executable by the processor to send to the second device a request for management information associated with the ad-hoc wireless network in response to detecting the beacon. The request identifies at least a first information element associated with at least a first portion of the management information and a second information element associated with at least a second portion of the management information. The instructions are further executable by the processor to receive from the second device a first wrapper information element. The first wrapper information element includes the first information element.

According to another particular illustrative embodiment, an apparatus includes means for detecting a beacon sent from a second device. The beacon is associated with an ad-hoc wireless network. The apparatus further includes means for sending to the second device a request for management information associated with the ad-hoc wireless network. The request identifies at least a first information element associated with at least a first portion of the management information and a second information element associated with at least a second portion of the management information. The apparatus further includes means for receiving from the second device a first wrapper information element. The first wrapper information element includes the first information element.

One particular advantage associated with at least one of the disclosed embodiments is improved allocation of network resources due to efficient management information communication techniques. For example, because a device may request specific management information (e.g., using indices associated with the management information), the device may avoid receiving a full set of management information (e.g., in response to a probe request). Because management information may be un-fragmented between messages (e.g., each such message is a "complete" or "self-contained" group of IEs), the device can use the management information without necessarily waiting for a subsequent message. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
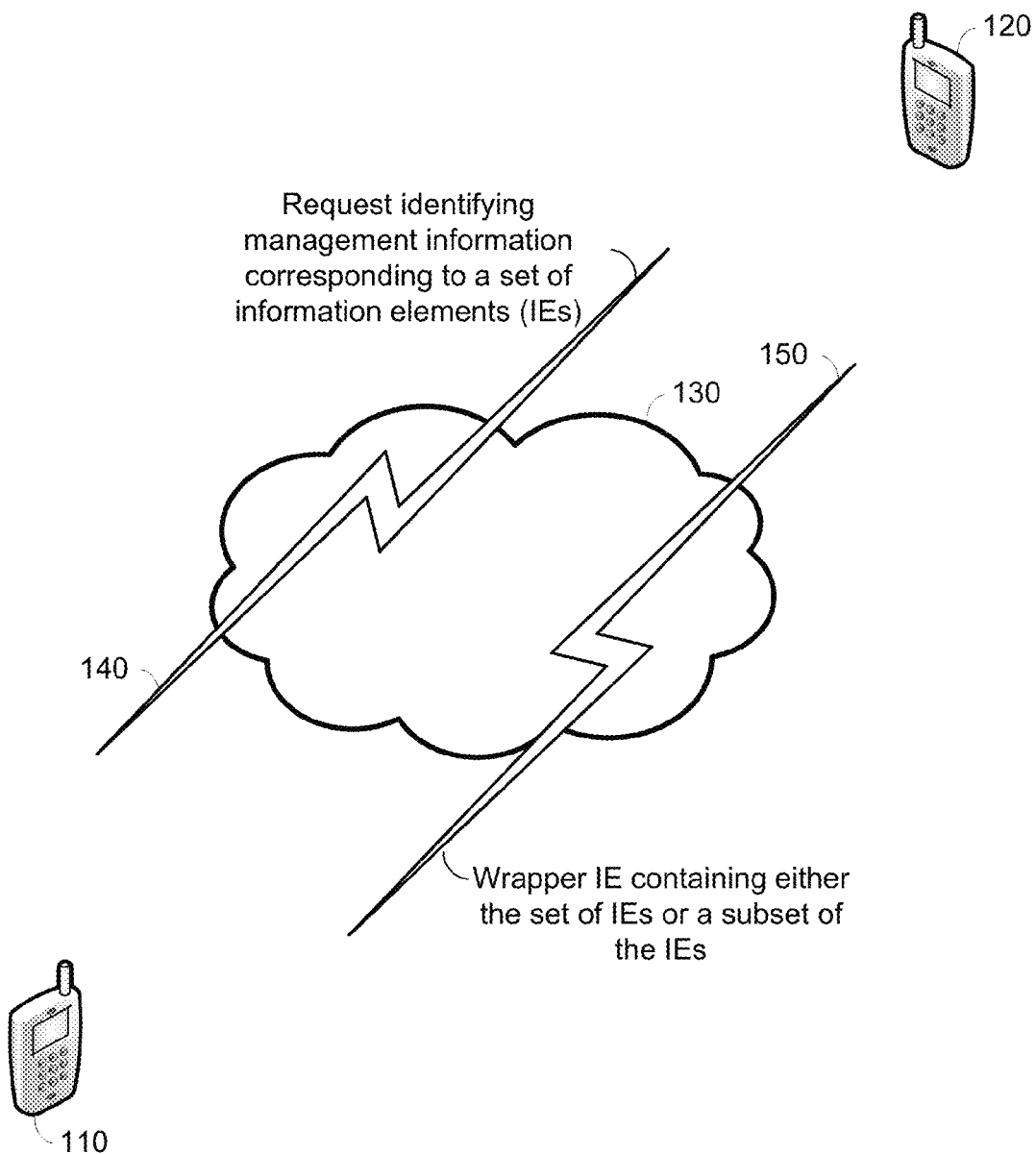
FIG. 1 is a diagram illustrating a particular illustrative embodiment of devices communicating within a network.

FIG. 1 depicts a particular illustrative embodiment of a first device 110 and a second device 120 communicating within a network 130. In at least one embodiment, the first device 110 and the second device 120 are mobile communication devices and the network 130 is or includes an ad-hoc wireless network. According to other embodiments, either or both of the first device 110 and the second device 120 may be an access point device. In addition to the embodiment depicted in FIG. 1, the network 130 may enable communication with additional devices (e.g., one or more mobile devices, one or more access points, or a combination thereof) not shown in FIG. 1. The network 130 may include wireless links (e.g., an ad-hoc wireless network) in addition to wired links (e.g., an Internet connection provided by an access point). The network 130 may operate in accordance with one or more communication standards, such as standards promulgated by the Institute of Electrical and Electronics Engineers (IEEE) (e.g., an IEEE 802.11 standard).

According to a particular example operation, the first device 110 obtains management information related to the network 130, related to the second device 120, or a combination thereof. For example, the first device 110 may detect a beacon or other signal identifying the network 130 sent by the second device 120. In at least one embodiment, the first device 110 sends a request 140 to the second device 120. The request 140 identifies management information corresponding to a set of information elements (IEs). For example, in response to detecting a beacon sent by the second device 120, the first device 110 may obtain an address of an access point associated with the network 130, a bandwidth associated with the network 130, an Internet connectivity associated with the network 130 (e.g., whether a connection to the Internet via an access point is available), a power level at which the first device 110 is to transmit data, or a combination thereof. Those of skill in the art will appreciate that other management information can be communicated via the network 130.

The second device 120 may receive the request 140 and may determine whether the set of IEs identified by the request 140 can be contained within a first wrapper information element (IE) 150. In at least one embodiment, wrapper IEs are management wrapper frames that are used by devices (e.g., the first device 110 and the second device 120) of the network 130 to transmit one or more IEs. If the set of IEs identified by the request 140 can be contained within the first wrapper IE 150, the second device 120 may include the set of IEs in the first wrapper IE 150 and may send the first wrapper IE 150 to the first device 110.

If the set of IEs identified by the request 140 cannot be contained within the first wrapper IE 150, the second device 120 may select a subset of the set of IEs to include in the first wrapper IE 150. The second device 120 may select the subset according to one or more selection criteria. For example, the second device 120 may select the subset based on priority associated with one or more of the IEs (e.g., by including more "important," or higher priority, IEs in the first wrapper IE 150), a number of the IEs (e.g., by selecting the subset such that the "most" IEs of the set can be included in the first wrapper IE 150), an ordering associated with two or more of the IEs (e.g., by determining that one IE is to be used by the first device 110 before the first device 110 uses another IE), or a combination thereof. In at least one embodiment, any remainder of the set of IEs identified by the request 140 (i.e., any IEs of the set not included in the first wrapper IE 150) are included in one or more subsequent wrapper IEs, as described further with reference to at least FIG. 2.

Further, the set of IEs may be un-fragmented between the first wrapper IE 150 and any subsequent wrapper IEs (e.g., the first wrapper IE 150 may include a "complete" or "self-contained" group of IEs), to enable the first device 110 to use IEs of the first wrapper IE 150 without waiting for a subsequent wrapper IE. In at least one embodiment, the second device 120 determines which of the set of IEs can be contained within the first wrapper IE 150 such that none of the IEs is "fragmented" between multiple wrapper IEs.

It will be appreciated that the example operation described with reference to FIG. 1 enables efficient communication of management information via the network 130. For example, by identifying a particular set of IEs via the request 140, the first device 110 may avoid receiving unnecessary IEs and may avoid overwhelming the second device 120 (e.g., where multiple devices are concurrently requesting management information from the second device 120). Further, selecting a subset of the IEs according to one or more selection criteria when the set cannot be included in a single wrapper IE may enable the first device 110 to use IEs of the first wrapper IE 150 without waiting for a subsequent wrapper IE.

Figure 2:
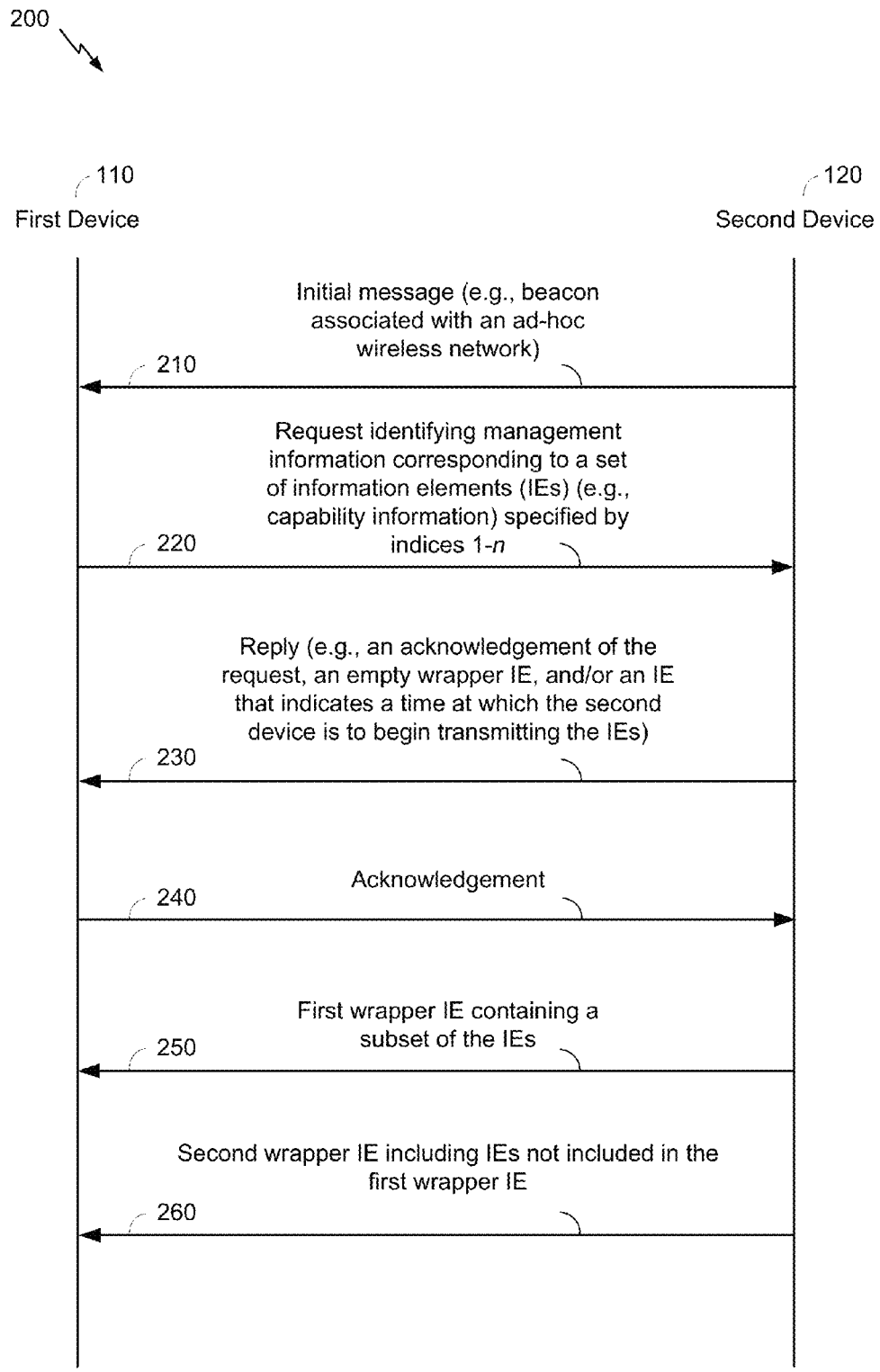
FIG. 2 is a timing diagram illustrating a particular illustrative embodiment of devices communicating within a network, such as the devices and the network of FIG. 1.

Referring to FIG. 2, a timing diagram 200 illustrates example communications between the first device 110 and the second device 120. The first device 110 and the second device 120 of FIG. 2 may be the first device 110 and the second device 120 described with reference to FIG. 1, respectively.

The second device 120 of FIG. 2 may send an initial message that is received by the first device 110, at 210. For example, the second device 120 may send a beacon associated with an ad-hoc wireless network, which may be the network 130 described with reference to FIG. 1. At 220, the first device 110 may send to the second device 120 a request (e.g., the request 140 of FIG. 1) identifying management information corresponding to a set of information elements (IEs) (e.g., capability information associated with the ad-hoc wireless network) specified by indices 1-n. Indices are described further with reference to at least FIG. 3.

In the particular example of FIG. 1, the second device 120 sends a reply to the first device 110, at 230. The reply may be sent by the second device 120 when the second device 120 is delayed from selecting and/or sending the IEs identified by the request. For example, if the second device 120 is performing other operations and cannot send the IEs within a predetermined time threshold, the second device 120 may send the reply to the first device 110. The reply may be any of an acknowledgement (ACK) of the request, an empty wrapper IE (e.g., a wrapper IE that does not include an IE), and/or an IE that indicates a time at which the second device is to begin transmitting the IEs. In other embodiments, if the second device 120 can begin sending one or more of the IEs within the predetermined time threshold, the second device 120 does not send the reply.

The first device 110 may send an acknowledgement (ACK) in response to the reply, at 240. In the particular example of FIG. 2, the second device 120 sends to the first device 110 a first wrapper IE (e.g., the first wrapper IE 150 of FIG. 1) that contains a subset of the IEs identified by the request, at 250. The second device 120 may select the subset according to one or more of the selection criteria described with reference to FIG. 1. At 260, the second device 120 sends to the first device 110 a second wrapper IE including the remainder of the set of IEs (i.e., those IEs of the set not included in the first wrapper IE). According to other embodiments, if the set of IEs can be contained within the first wrapper IE, the second device 120 does not send the second wrapper IE. According to further embodiments, three or more wrapper IEs may be used to transmit the set of IEs identified by the request.

Figure 3:
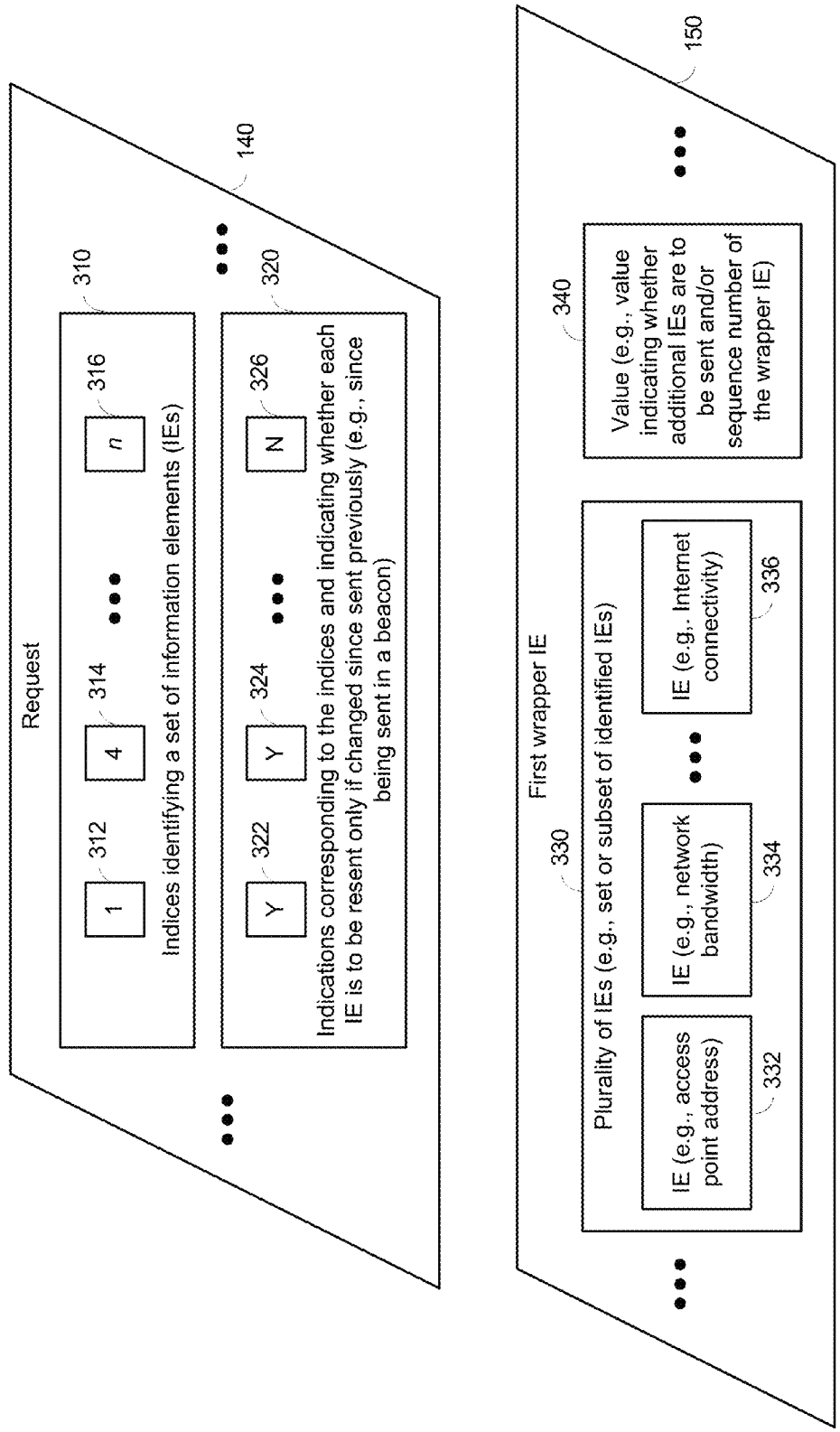
FIG. 3 is a diagram illustrating a particular illustrative embodiment of communications exchanged between devices of a network, such as the devices and the network of FIG. 1.

FIG. 3 depicts a particular illustrative example of a request 140 and a first wrapper information element (IE) 150. In at least one embodiment, the request 140 and the first wrapper IE 150 of FIG. 3 are the request 140 and the first wrapper IE 150 of FIG. 1, respectively. The request 140 of FIG. 3 may be sent by the first device 110 of FIG. 1 or 2 and may be received by the second device 120 of FIG. 1 or 2. The first wrapper IE 150 of FIG. 3 may be sent by the second device 120 of FIG. 1 or 2 and may be received by the first device 110 of FIG. 1 or 2.

In the embodiment depicted in FIG. 3, the request 140 includes a plurality of indices 310 identifying a set of IEs. As shown in FIG. 3, the plurality of indices 310 may include a first index 312, a second index 314, and an nth index 316, where n is an integer greater than two.

The first wrapper IE 150 of FIG. 3 includes a plurality of IEs 330. The plurality of IEs may be the set of IEs identified by the request 140 or may be a subset of the IEs identified by the request 140. The plurality of IEs 330 may include a first IE 332, a second IE 334, and an mth IE 336, where m is an integer greater than two. In a particular embodiment, the first IE 332 corresponds to the first index 312, the second IE 334 corresponds to the second index 314, and the mth IE 336 corresponds to the nth index 316. The first wrapper IE 150 further includes a value 340. The value 340 may indicate whether additional IEs are to be sent (e.g., whether a second wrapper IE containing additional IEs is to be sent), a sequence number of the first wrapper IE 150 in a sequence of IEs (e.g., how many IEs in a sequence have preceded the first wrapper IE 150), or a combination thereof.

The request 140 of FIG. 3 further includes a plurality of indications 320 corresponding to the plurality of indices 310 and indicating whether each of the set of IEs is to be resent only if changed since sent previously (e.g., since being sent in a beacon or since being requested previously). For example, the plurality of indications 320 includes a first indication 322 corresponding to the first index 312, a second indication 324 corresponding to the second index 314, and an nth indication 326 corresponding to the nth index 316. In the example of FIG. 3, the first indication 322 indicates that the first IE 332 is to be resent only if the first IE 332 has changed since last being sent, the second indication 324 indicates that the second IE 334 is to be resent only if the second IE 334 has changed since last being sent, and the nth indication 326 indicates that the mth IE 336 is to be resent irrespective of whether the mth IE 336 has changed since last being sent.

It will be appreciated that the request 140 and the first wrapper IE 150 of FIG. 3 may enable selective identification and communication of particular IEs of interest. Accordingly, by communicating using the request 140 and the first wrapper IE 150 of FIG. 3, transmission and reception of unneeded network management information may be avoided. Further, because the plurality of indices 320 may indicate whether each of the set of IEs is to be resent only if changed since sent previously, transmission and reception of duplicative management information can be avoided. Alternatively or in addition to selectively identifying particular IEs, "generic" network management information may be requested and transmitted, as described further with reference to at least FIG. 4.

Figure 4:
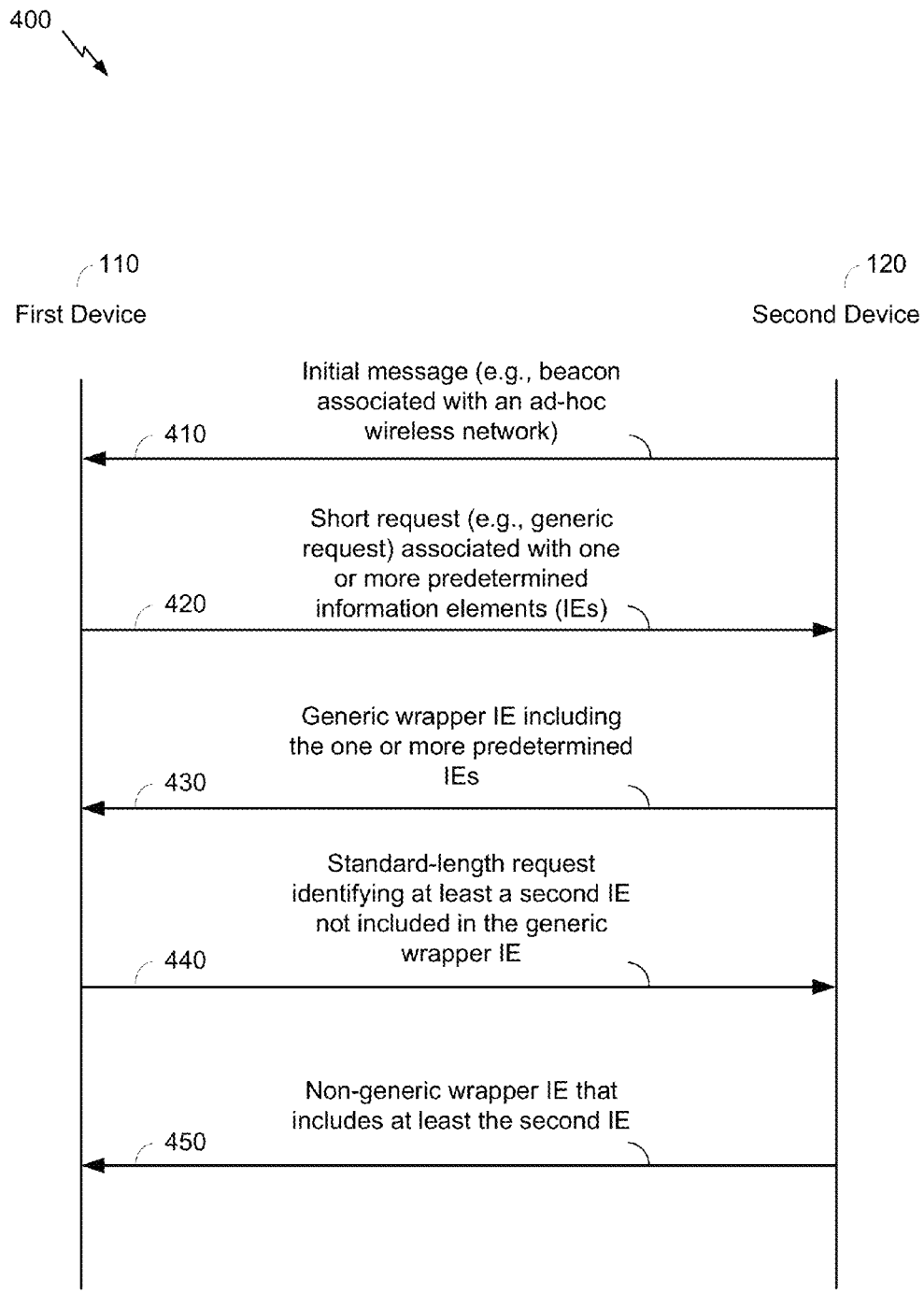
FIG. 4 is a timing diagram illustrating a particular illustrative embodiment of devices communicating within a network, such as the devices and the network of FIG. 1.

Referring to FIG. 4, a timing diagram 400 illustrates example communications between a first device 110 and a second device 120. The first device 110 and the second device 120 of FIG. 4 may be the first device 110 and the second device 120 described with reference to FIG. 1, respectively, the first device 110 and the second device 120 described with reference to FIG. 2, respectively, or a combination thereof. Further, operations described with reference to the timing diagram 200 of FIG. 2 may be incorporated into the timing diagram 400 of FIG. 4, and vice versa.

At 410, the second device 120 transmits an initial message that is received by the first device 110. The initial message may be a beacon associated with a network, such as the network 130 of FIG. 1. In response to receiving the initial message, the first device 110 sends a short request to the second device 120, at 420. The short request may be a "generic" request that identifies one or more predetermined information elements (IEs). In at least one embodiment, the short request corresponds to a request for an address of an access point associated with the network.

At 430, the second device 120 responds to the short request by sending to the first device 110 a "generic" wrapper IE that includes the one or more predetermined IEs. In at least one embodiment, the one or more predetermined IEs includes the address of the access point associated with the network. At 440, the first device 110 sends to the second device 120 a standard-length request that identifies at least a second IE not included in the generic wrapper IE. The standard-length request may be the request 140 of FIG. 1 or 3. The second device 120 responds to the standard-length request by sending to the first device 110 a non-generic wrapper IE that includes at least the second IE, at 450. The non-generic wrapper IE may be the first wrapper IE 150 of FIG. 1 or 3.

It will be appreciated that the short request described with reference to FIG. 4 may enable the first device 110 to obtain "default" or "generic" network management information, which the first device 110 may use to determine whether to request additional network information. Because the short request and the generic wrapper IE may be associated with predetermined network information (e.g., an address of an access point), the short request and the generic wrapper IE may be of short durations and may be transmitted at high data rates, improving performance of the network.

Figure 5:
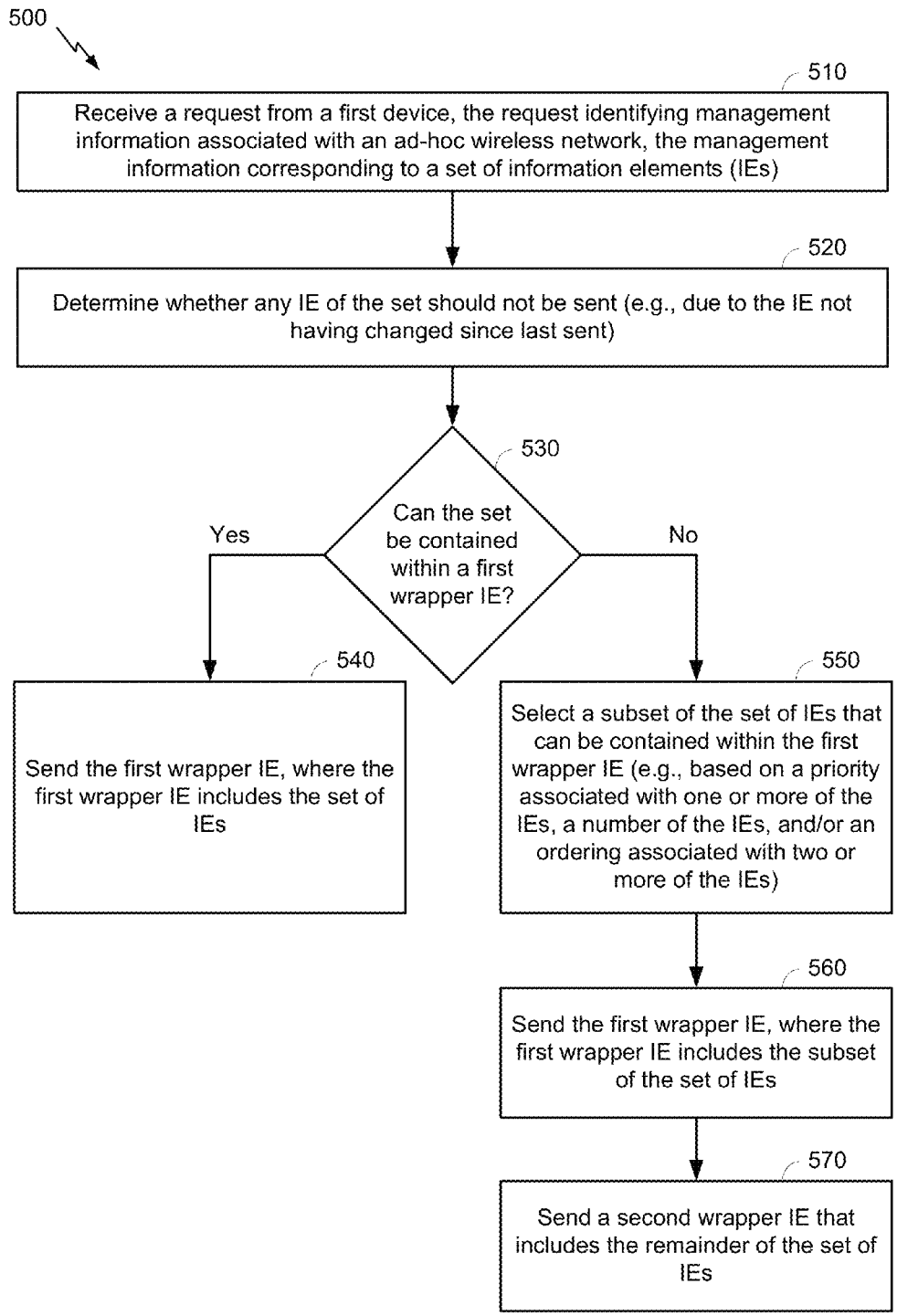
FIG. 5 is a flow diagram illustrating a particular illustrative embodiment of a method of communicating between devices of a network, such as the devices and the network of FIG. 1.

Referring to FIG. 5, a particular illustrative embodiment of a method of communicating in a network is disclosed and generally designated 500. The method 500 may be performed by the second device 120 of FIG. 1, 2, or 4.

The method 500 includes receiving a request (e.g., the request 140 of FIG. 1 or 3) from a first device (e.g., the first device 110 of FIG. 1, 2, or 4), at 510. The request identifies management information associated with an ad-hoc wireless network, which may be the network 130 of FIG. 1. The management information corresponds to a set of information elements (IEs), such as the plurality of IEs 330 of FIG. 3.

At 520, a determination is made whether any IE of the set should not be sent. For example, continuing with the example illustration of FIG. 3, if the request identifies a first IE 332 via the first index 312 and indicates via the first indication 322 that the first IE 332 is to be sent only if the first IE 332 has changed since last being sent by the second device, then a determination may be made whether the first IE has changed since last being sent by the second device. For ease of illustration, the example of FIG. 5 assumes that each IE of the set is determined to be sent. According to other embodiments, one or more of the set of IEs may be determined not to be sent.

At 530, a determination is made whether the set can be contained within a first wrapper IE (e.g., the first wrapper IE 150 of FIG. 1 or 3). For example, the sum of the lengths of the IEs may be compared to a frame length associated with the first wrapper IE to determine whether the set of IEs can be contained within the first wrapper IE. If the set can be contained within the first wrapper IE, then the method 500 includes sending the first wrapper IE, where the first wrapper IE includes the set of IEs, at 540.

If the set cannot be contained within the first wrapper IE, then the method 500 includes selecting a subset of the set of IEs that can be contained within the first wrapper IE, at 550. The subset may be determined based on one or more of the selection criteria described with reference to FIG. 1. For example, the subset may be determined based on a priority associated with one or more of the IEs, a number of the IEs, an ordering associated with two or more of the IEs, or a combination thereof. The method 500 may further include sending a second wrapper IE that includes the remainder of the set of IEs, at 570. As will be appreciated, if the set of IEs cannot be contained within two wrapper IEs, then the method 500 may include sending additional wrapper IEs, such as a third wrapper IE (not shown in FIG. 3).

Figure 6:
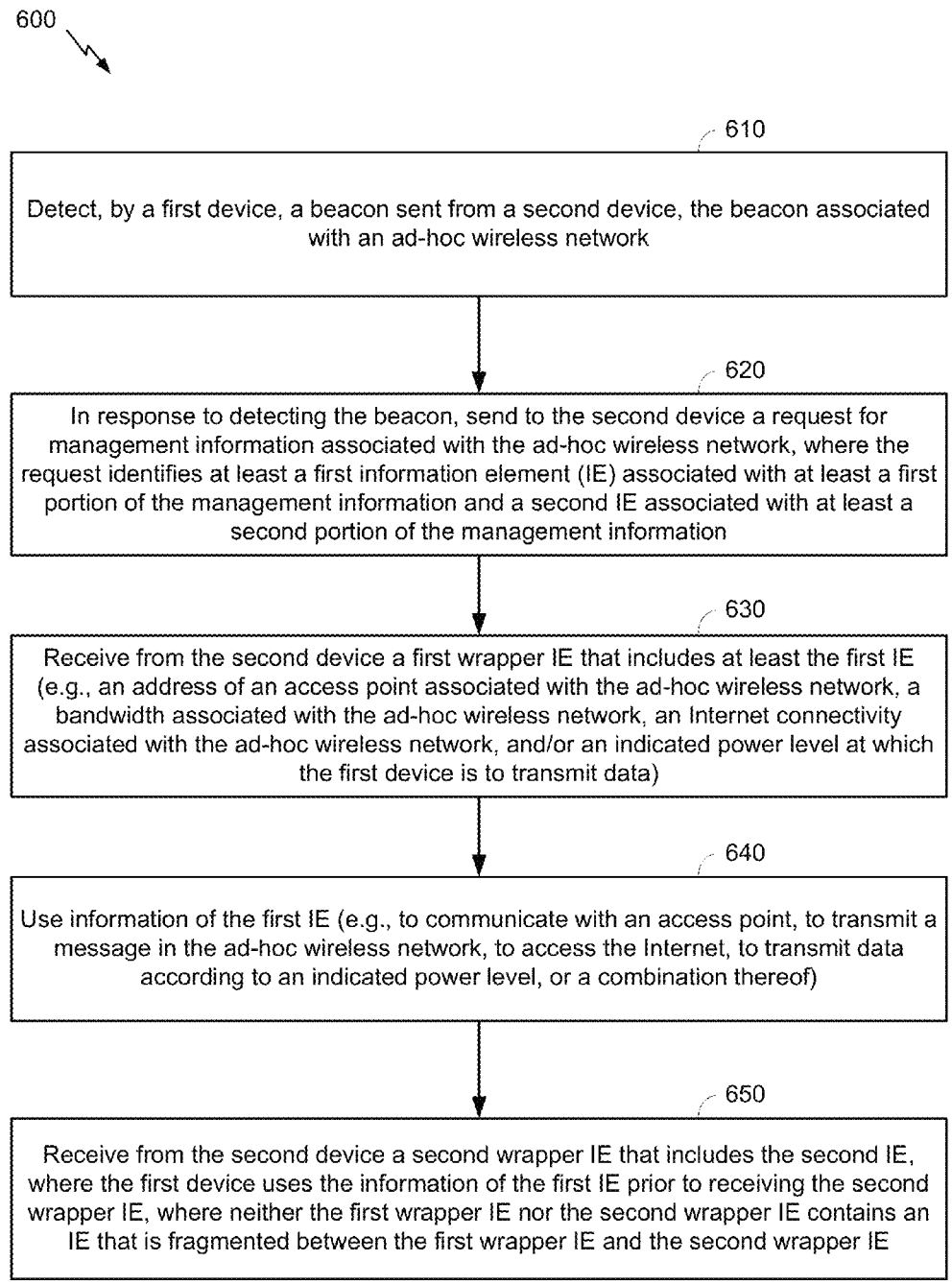
FIG. 6 is a flow diagram illustrating another particular illustrative embodiment of a method of communicating between devices of a network, such as the devices and the network of FIG. 1.

Referring to FIG. 6, another particular illustrative embodiment of a method of communicating in a network is disclosed and generally designated 600. The method 600 includes detecting by a first device (e.g., the first device 110 of FIG. 1, 2, or 4) a beacon sent from a second device (e.g., the second device 120 of FIG. 1, 2, or 4), at 610. The beacon is associated with an ad-hoc wireless network, which may be the network 130 of FIG. 1.

In response to detecting the beacon, a request (e.g., the request 140 of FIG. 1 or 3) for management information associated with the ad-hoc wireless network is sent to the second device, at 620. The request may identify at least a first information element (IE) associated with at least a first portion of the management information and a second IE associated with at least a second portion of the management information. For example, the request may identify one or more of the first IE 332 of FIG. 3, the second IE 334 of FIG. 3, and the mth IE 336 of FIG. 3.

The method 600 further includes receiving from the second device a first wrapper IE (e.g., the first wrapper IE 150 of FIG. 1 or 3) that includes at least the first IE, at 630. The first IE may identify an address of an access point associated with the ad-hoc wireless network, a bandwidth associated with the ad-hoc wireless network, an Internet connectivity associated with the ad-hoc wireless network, a power level at which the first device is to transmit data, or a combination thereof.

The method 600 further includes using information of the first IE (e.g., to communicate with an access point, to transmit a message of the ad-hoc wireless network, to access the Internet, to transmit data according to an indicated power level, or a combination thereof), at 640. At 650, a second wrapper IE is received from the second device. The second wrapper IE includes the second IE.

Because neither the first wrapper IE nor the second wrapper IE in the example embodiment of FIG. 6 contains an IE that is "fragmented" (e.g., split) between the first wrapper IE and the second wrapper IE, the first device begins using the information of the first IE prior to receiving the second wrapper IE. Accordingly, communicating according to the method 600 of FIG. 6 may avoid instances of a device "waiting" to receive a second wrapper IE before using the information received in the first wrapper IE.

Figure 7:
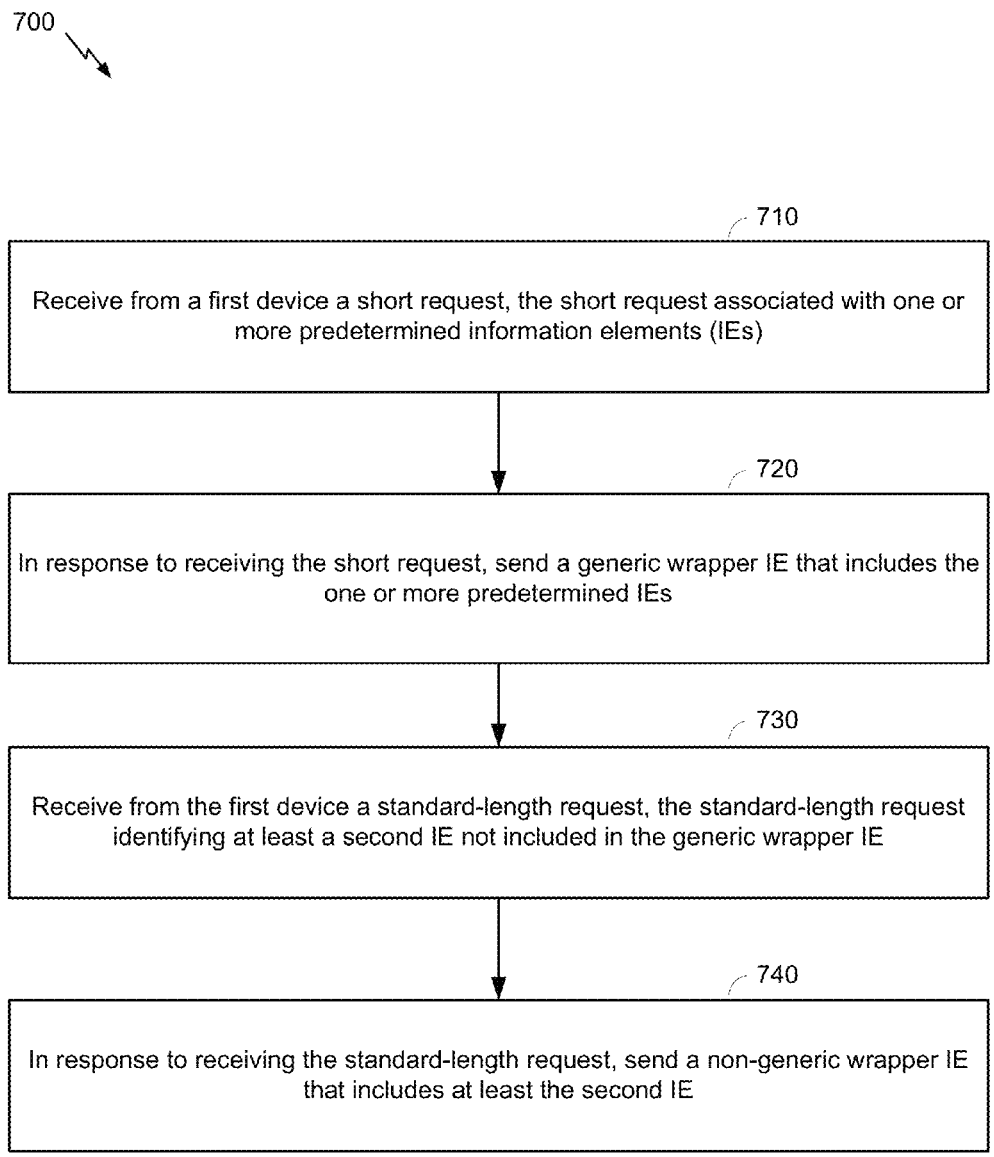
FIG. 7 is a flow diagram illustrating another particular illustrative embodiment of a method of communicating between devices of a network, such as the devices and the network of FIG. 1.

Referring to FIG. 7, another particular illustrative embodiment of a method of communicating in a network is disclosed and generally designated 700. The method 700 may be performed by the second device 120 of FIG. 1, 2, or 4.

The method 700 includes receiving a short request from a first device (e.g., the first device 110 of FIG. 1, 2, or 4), at 710. The short request is associated with one or more predetermined IEs, which may be one or more of the plurality of IEs 330 of FIG. 3. The short request may be the short request described with reference to FIG. 4.

In response to receiving the short request, a generic wrapper IE is sent, at 720. The generic wrapper IE includes the one or more predetermined IEs. The generic wrapper IE may be the generic wrapper IE described with reference to FIG. 4. At 730, a standard-length request is received from the first device. The standard-length request identifies at least a second IE not included in the generic wrapper IE. The standard-length request may be the standard-length request described with reference to FIG. 4. In response to receiving the standard-length request, a non-generic wrapper IE that includes at least the second IE is sent, at 740. The non-generic wrapper IE may be the non-generic wrapper IE described with reference to FIG. 4 or the first wrapper IE 150 of FIG. 1 or 3.

Figure 8:
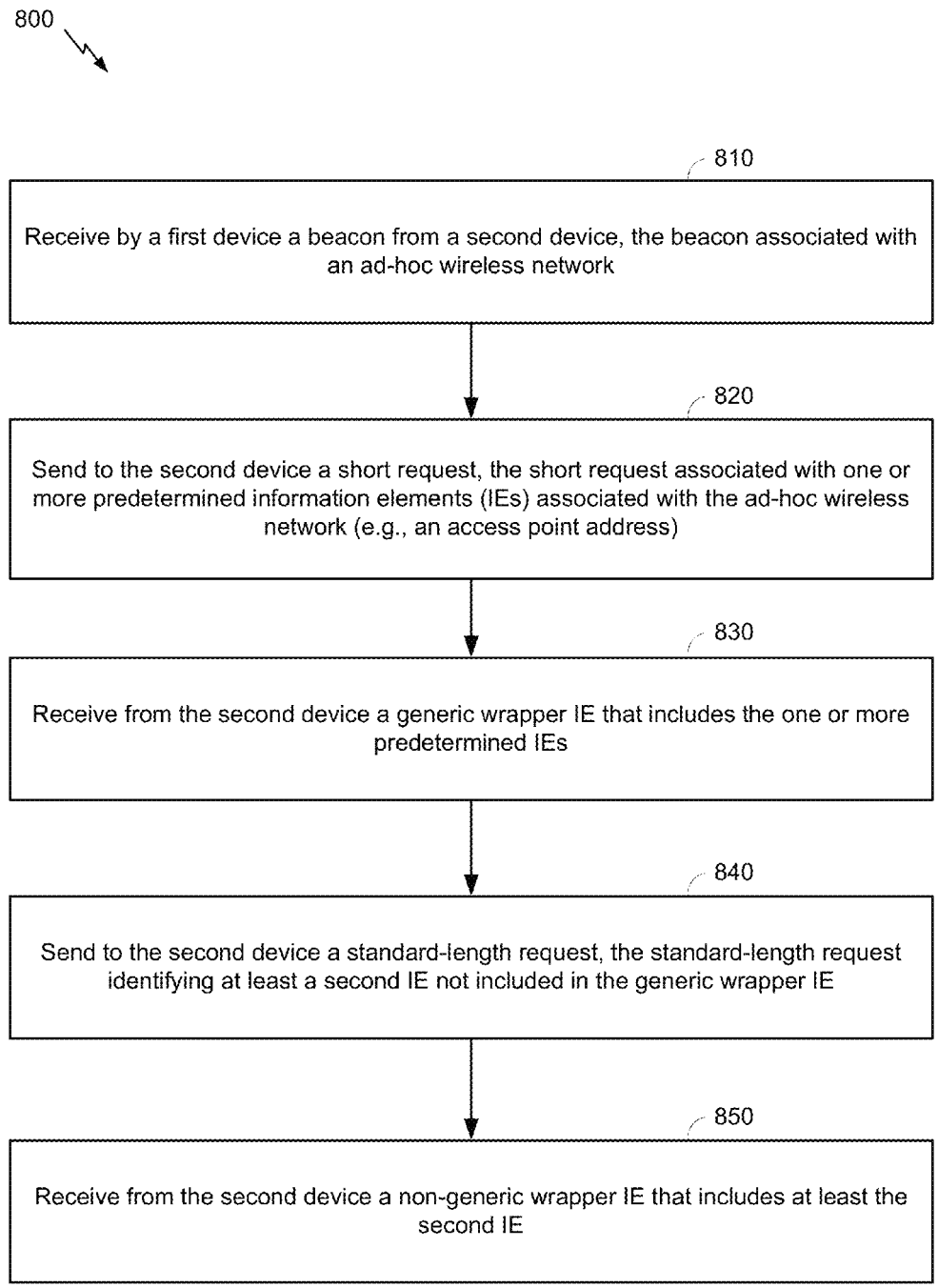
FIG. 8 is a flow diagram illustrating another particular illustrative embodiment of a method of communicating between devices of a network, such as the devices and the network of FIG. 1.

Referring to FIG. 8, a particular illustrative embodiment of a method of communicating in a network is disclosed and generally designated 800. The method 800 includes receiving by a first device (e.g., the first device 110 of FIG. 1, 2, or 4) a beacon from a second device (e.g., the second device 120 of FIG. 1, 2, or 4), at 810. The beacon is associated with an ad-hoc wireless network, which may be the network 130 of FIG. 1.

At 820, a short request is sent to the second device. The short request is associated with one or more predetermined information elements (IEs) associated with the ad-hoc wireless network (e.g., an access point address). The one or more predetermined IEs may be any one or more of the plurality of IEs 330 of FIG. 3. The short request may be the short request described with reference to FIG. 4.

A generic wrapper IE is received from the second device, at 830. The generic wrapper IE includes the one or more predetermined IEs. The generic wrapper IE may be the generic wrapper IE described with reference to FIG. 4. The method 800 further includes sending to the second device a standard-length request, at 840. The standard-length request identifies at least a second IE not included in the generic wrapper IE. The standard-length request may be the standard-length request described with reference to FIG. 4. At 850, a non-generic wrapper IE that includes at least the second IE is received from the second device. The non-generic wrapper IE may be the non-generic wrapper IE described with reference to FIG. 4.

Figure 9:
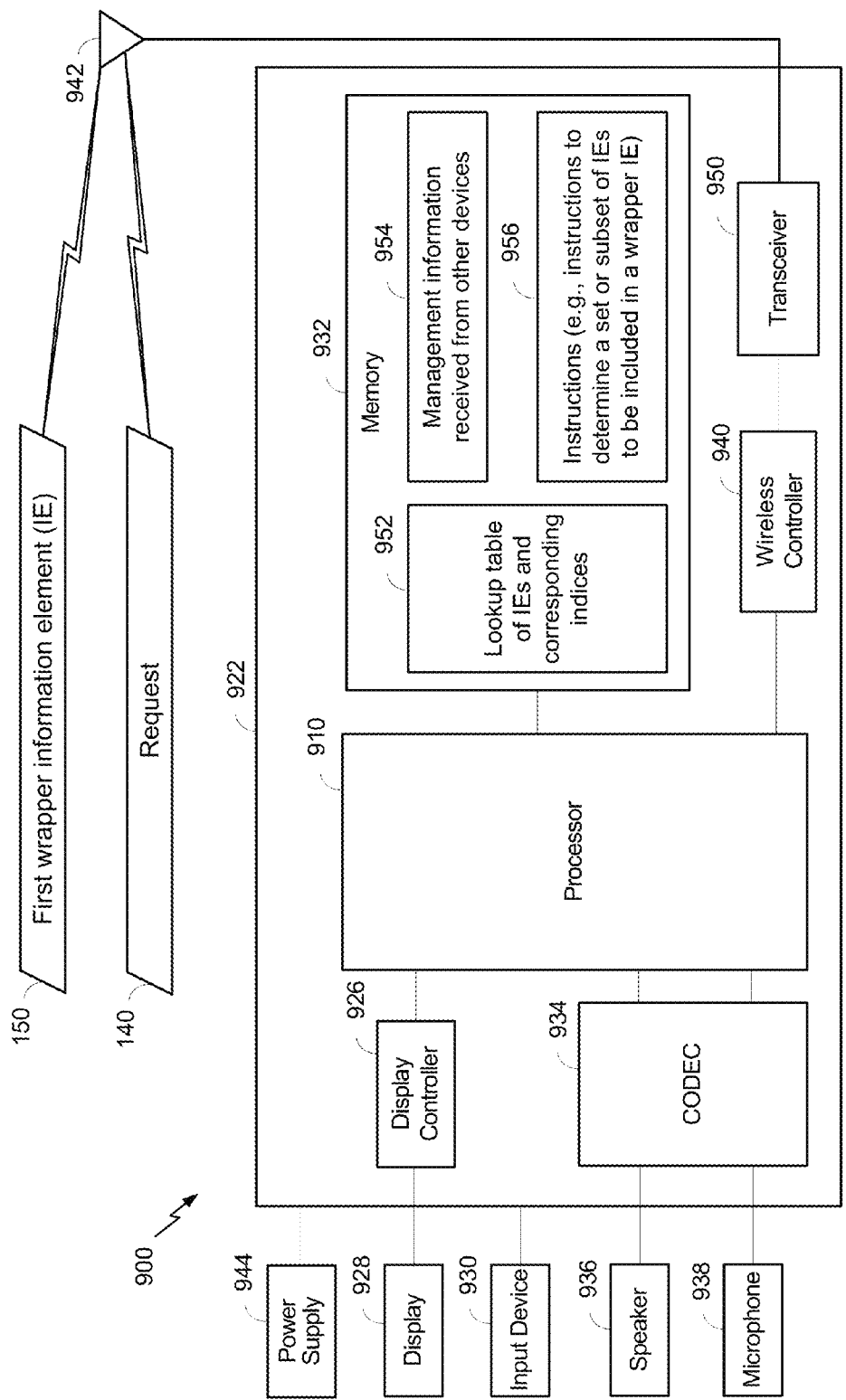
FIG. 9 is a diagram illustrating another particular illustrative embodiment of a device communicating using a network, such as the network and one of the devices of FIG. 1.

FIG. 9 depicts a block diagram of a particular illustrative embodiment of a device 900, a request 140, and a first wrapper information element (IE) 150. The device 900 of FIG. 9 may be the first device 110 of FIG. 1, 2, or 4 or the second device 120 of FIG. 1, 2, or 4. The request 140 of FIG. 9 may be the request 140 of FIG. 1 or 3. The first wrapper IE 150 of FIG. 9 may be the first wrapper IE 150 of FIG. 1 or 3. The device 900 may be a mobile communication device that is configured communicate via a network, such as the network 130 of FIG. 1.

The device 900 includes a processor 910, such as a digital signal processor (DSP). The processor 910 may execute instructions, such as instructions 956 stored at a memory 932. In a particular embodiment, the processor 910 is configured to send and to receive requests (e.g., the request 140) and is further configured to send and to receive wrapper IEs (e.g., the first wrapper IE 150) by executing the instructions 956. For example, the instructions 956 may be executable by the processor 910 to receive the request 140, to determine whether a set of IEs identified by the request 140 can be contained within the first wrapper IE 150, to determine a subset of the IEs to be included in the first wrapper IE 150, and to send the first wrapper IE 150 to the device that send the request 140. Alternatively or in addition, the instructions 956 may be executable by the processor 910 to send the request 140 and to receive the first wrapper IE 150, where the first wrapper IE 150 includes a set or a subset of IEs identified by the request 140.

The memory 932 may further store a lookup table 952. The lookup table 952 may map management information, such as IEs, to corresponding indices. For example, continuing with the example embodiment of FIG. 3, the lookup table 952 may map the first index 312 to the first IE 332, the second index 314 to the second IE 334, and the nth index 316 to the mth IE 336. The lookup table 952 may be provisioned by a manufacturer of or a vendor of the device 900, may be received and/or updated via a communication from a service provider (e.g., via a firmware update), may be received and/or updated according to other suitable techniques known in the art, or a combination thereof. The lookup table 952 may be accessed by the processor 910 of the device 900 when sending and/or receiving the request 140, when sending and/or receiving the first wrapper IE 150, or a combination thereof.

The memory 932 further stores management information 954 (e.g., IEs) received from other devices. For example, the device 900 may receive the first wrapper IE 150. The first wrapper IE 150 may include one or more IEs, which may be any of the IEs described herein, such as the first IE 332 of FIG. 3, the second IE 334 of FIG. 3, the mth IE 336 of FIG. 3, or a combination thereof. The device 900 may be configured to receive the first wrapper IE 150, to store the IE 958 at the memory 932, and to use the IE 958 to communicate with devices via the network.

FIG. 9 also depicts that the device 900 includes a display controller 926 coupled to the processor 910. The display controller 926 is configured to control a display 928. A coder/decoder (CODEC) 934 may also be coupled to the processor 910. A speaker 936 and a microphone 938 may be responsive to the CODEC 934. FIG. 9 further depicts that a wireless controller 940 can be coupled to the processor 910, to a transceiver 950, and to a wireless antenna 942. Alternatively, the transceiver 950 may be implemented as a transmitter/receiver pair. The device 900 may further include an input device 930 and a power supply 944.

The processor 910, the memory 932, the display controller 926, the CODEC 934, the wireless controller 940, and the transceiver 950 may be included in a system-in-package or system-on-chip device 922. Moreover, in a particular embodiment and as illustrated in FIG. 9, the display 928, the input device 930, the speaker 936, the microphone 938, the wireless antenna 942, and the power supply 944 are external to the system-on-chip device 922. However, each of the display 928, the input device 930, the speaker 936, the microphone 938, the wireless antenna 942, and the power supply 944 can be coupled to one or more additional components of the system-on-chip device 922, such as an interface or other controller (not shown in FIG. 9).

In connection with at least one of the disclosed embodiments, an apparatus (e.g., the first device 110 of FIG. 1, 2, or 4 or the device 900 of FIG. 9) includes a memory (e.g., the memory 932 of FIG. 9) and a processor (e.g., the processor 910 of FIG. 9) coupled to the memory. The processor is configured to detect a beacon sent from a second device (e.g., the second device 120 of FIG. 1, 2, or 4 or the device 900 of FIG. 9). The beacon is associated with an ad-hoc wireless network, which may be the network 130 of FIG. 1. The processor is further configured to send, in response to detecting the beacon, a request (e.g., the request 140 of FIG. 1, 3, or 9) for management information associated with the ad-hoc wireless network to the second device. The request identifies at least a first information element associated with at least a first portion of the management information and a second information element associated with at least a second portion of the management information. The first information element and the second information element may be any of the first IE 332 of FIG. 3, the second IE 334 of FIG. 3, the mth IE 336 of FIG. 3, or a combination thereof. The management information may be the management information 954 of FIG. 9. The processor is further configured to receive from the second device a first wrapper information element (e.g., the first wrapper IE 150 of FIG. 1, 3, or 9). The first wrapper information element includes the first information element.

In connection with at least one of the disclosed embodiments, a computer-readable non-transitory storage medium (e.g., the memory 932 of FIG. 9) is encoded with instructions (e.g., the instructions 956 of FIG. 9). The instructions are executable by a processor (e.g., the processor 910 of FIG. 9) to detect a beacon sent from a second device (e.g., the second device 120 of FIG. 1, 2, or 4 or the device 900 of FIG. 9). The beacon is associated with an ad-hoc wireless network, which may be the network 130 of FIG. 1. The instructions are further executable by the processor to send to the second device a request (e.g., the request 140 of FIG. 1, 3, or 9) for management information associated with the ad-hoc wireless network in response to detecting the beacon. The request identifies at least a first information element associated with at least a first portion of the management information and a second information element associated with at least a second portion of the management information. The first information element and the second information element may be any of the first IE 332 of FIG. 3, the second IE 334 of FIG. 3, the mth IE 336 of FIG. 3, or a combination thereof. The management information may be the management information 954 of FIG. 9. The instructions are further executable by the processor to receive from the second device a first wrapper information element (e.g., the first wrapper IE 150 of FIG. 1, 3, or 9). The first wrapper information element includes the first information element.

In connection with at least one of the disclosed embodiments, an apparatus (e.g., the first device 110 of FIG. 1, 2, or 4 or the device 900 of FIG. 9) includes means for detecting (e.g., the transceiver 950 of FIG. 9) a beacon sent from a second device (e.g., the second device 120 of FIG. 1, 2, or 4 or the device 900 of FIG. 9). The beacon is associated with an ad-hoc wireless network, which may be the network 130 of FIG. 1. The apparatus further includes means for sending (e.g., the transceiver 950 of FIG. 9) to the second device a request (e.g., the request 140 of FIG. 1, 3, or 9) for management information (e.g., the management information 954 of FIG. 9) associated with the ad-hoc wireless network. The request identifies at least a first information element associated with at least a first portion of the management information and a second information element associated with at least a second portion of the management information. The first information element and the second information element may be any of the first IE 332 of FIG. 3, the second IE 334 of FIG. 3, the mth IE 336 of FIG. 3, or a combination thereof. The apparatus further includes means for receiving (e.g., the transceiver 950 of FIG. 9) from the second device a first wrapper information element (e.g., the first wrapper IE 150 of FIG. 1, 3, or 9). The first wrapper information element includes the first information element.

Various features described herein with reference to FIGS. 1-9 are illustrative and should be considered neither exhaustive nor limiting. For example, while FIG. 3 depicts an illustrative request 140 and an example wrapper IE 150, additional fields, data, or information may be included in the request 140 and the first wrapper IE 150. According to various embodiments, communications described herein may include a media access control (MAC) header, a frame body, and a frame control sequence (FCS). In at least one embodiment, the MAC header is 24 bytes long, the frame body is of variable length, and the FCS is four bytes long. The MAC header may provide routing information and may include a frame control (FC) field, a duration field, a destination address (DA) field, a source address (SA) field, a basic service set identification (BSSID) field, and a sequence control field. In a particular embodiment, the FC field is two bytes long, the duration field is two bytes long, the DA field is six bytes long, the SA field is six bytes long, the BSSID field is six bytes long, and the sequence control field is two bytes long. The frame body may provide information about the transmitting device and may include a timestamp field, a beacon interval field, a capability information field, a service set identifier (SSID) field, a supported rates field, a frequency-hopping (FH) parameter set, a direct-sequence parameter set, a contention-free parameter set, an independent basic service set (IBSS) parameter set, a country information field, a FH hopping parameter field, a FH pattern table, a power constraint field, a channel switch announcement field, a quiet field, a IBSS direct frequency selection (DFS) field, a transmit power control (TPC) field, an effective radiated power (ERP) information field, an extended supported rates field, and a robust security network (RSN) field. In a particular embodiment, the timestamp field is eight bytes long, the beacon interval field is two bytes long, the capability information field is two bytes long, the SSID field is of a variable length, the supported rates field is of a variable length, the FH parameter set is seven bytes long, the direct-sequence parameter set is two bytes long, the contention-free parameter set is eight bytes long, the IBSS parameter set is 4 bytes long, the country information field is a variable length, the FH hopping parameter field is four bytes long, the FH pattern table is a variable length, the power constraint field is three bytes long, the channel switch announcement field is six bytes long, the quiet field is eight bytes long, the IBSS DFS field is a variable length, the TPC field is four bytes long, the ERP information field is three bytes long, an extended supported rates field is a variable length, and the RSN field is a variable length.

According to one embodiment, the short request described with reference to FIGS. 4, 7, and 8 includes a frame control (FC) comprising 2 bytes, a duration field comprising 2 bytes, a source address (SA) field comprising 6 bytes, a sequence control field comprising 2 bytes, an SSID hash comprising a single byte, a timestamp comprising 4 bytes, a field indicating a beacon interval comprising 2 bytes, a capability field comprising 1 byte and indicating transmitter capabilities, an indication of the channel info comprising 2 bytes, and a cyclic redundancy checksum (CRC) comprising 4 bytes. The capability information field may provide information regarding wireless capabilities of a transmitting device.

The operations described with reference to FIGS. 1-9 may be implemented by hardware, by hardware that processes instructions (e.g., software) stored on a computer-readable non-transitory medium, or by using both hardware and instructions. For example, the operations described with reference to FIGS. 1-9 may be implemented using a field-programmable gate array (FPGA) device, an application-specific integrated circuit (ASIC), a processing unit such as a central processing unit (CPU), a digital signal processor (DSP), a controller, another hardware device, firmware device, or any combination thereof. While some illustrative implementations are described with reference to FIGS. 1-9, those of skill in the art will recognize that alternate or additional implementations are within the scope of the present disclosure.

Those of skill would further appreciate that the various illustrative logical blocks, configurations, modules, circuits, and method steps described in connection with the embodiments disclosed herein may be implemented as electronic hardware, instructions stored on a tangible computer readable medium and to be executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of various methods or processes described in connection with the embodiments disclosed herein may be embodied directly in hardware, in instructions executed by a processor, or in a combination of the two. Instructions to be executed by a processor may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:
1. A method comprising:
    receiving from a first device a short request via a network, the short request associated with one or more predetermined information elements;
    in response to receiving the short request, sending a generic wrapper information element that includes the one or more predetermined information elements;
    receiving from the first device a standard-length request, the standard-length request including:
        a plurality of identifiers identifying a plurality of information elements not included in the generic wrapper information element, and
        a plurality of indicators, each indicator indicating whether a corresponding identified information element is to be sent to the first device if the corresponding identified information element is unchanged since previously sent to the first device; and
    in response to receiving the standard-length request, sending a non-generic wrapper information element that conditionally includes each of the identified information elements based at least in part on its corresponding indicator.
2. The method of claim 1, performed at least in part by a transceiver of a second device.
3. A method comprising:
    receiving by a first device a beacon from a second device, the beacon associated with a network;
    sending to the second device a short request, the short request associated with one or more predetermined information elements associated with the network;

receiving from the second device a generic wrapper information element that includes the one or more predetermined information elements;

sending to the second device a standard-length request, the standard-length request including:
    a plurality of identifiers identifying a plurality of information elements not included in the generic wrapper information element;
    a plurality of indicators, each indicator indicating whether a corresponding identified information element is to be sent to the first device if the corresponding identified information element is unchanged since previously sent to the first device; and receiving from the second device a non-generic wrapper information element that includes at least an identified information element.

4. The method of claim 3, performed at least in part by a transceiver of a first device.

5. The method of claim 3, wherein the network is an ad hoc wireless network.

6. The method of claim 3, wherein the one or more predetermined information elements are selected according to one or more selection criteria, the one or more selection criteria identified by the second device.

7. The method of claim 1, wherein the network is an ad hoc wireless network.

8. The method of claim 1, further comprising sending a second generic wrapper information element comprising one or more predetermined information elements, the predetermined information elements being sent in an order according to one or more selection criteria identified by the second device.

9. An apparatus comprising:
a processor coupled to the memory and configured to:
    receive from a first device a short request, the short request associated with one or more predetermined information elements;
    send, in response to receiving the short request, a generic wrapper information element that includes the one or more predetermined information elements;
    receive from the first device a standard-length request, the standard-length request including:
        a plurality of identifiers identifying a plurality of information elements not included in the generic wrapper information element, and a plurality of indicators, each indicator indicating whether a corresponding identified information element is to be sent to the first device if the corresponding identified information element is unchanged since previously sent to the first device; and
    send, in response to receiving the standard-length request, a non-generic wrapper information element that conditionally includes each of the identified information elements based at least in part on its corresponding indicator.

10. The apparatus of claim 9, wherein the processor is further configured to send one or more generic wrapper information elements, comprising the one or more predetermined information elements, according to one or more selection criteria, the one or more selection criteria identified by the second device.

11. An apparatus comprising:
means for receiving a short request from a first device via a network, the short request associated with one or more predetermined information elements;

means for sending a generic wrapper information element that includes the one or more predetermined information elements, in response to receiving the short request;

means for receiving a standard-length request from the first device, the standard-length request including:
a plurality of identifiers identifying a plurality of information elements not included in the generic wrapper information element, and
a plurality of indicators, each indicator indicating whether a corresponding identified information element is to be sent to the first device if the corresponding identified information element is unchanged since previously sent to the first device; and means for sending, in response to receiving the standard-length request, a non-generic wrapper information element that conditionally includes each of the identified information elements based at least in part on its corresponding indicator.

12. An apparatus comprising:
a processor coupled to the memory and configured to:
    receive a beacon from a second device, the beacon associated with a network;
    send to the second device a short request, the short request associated with one or more predetermined information elements associated with the network;
    receive from the second device a generic wrapper information element that includes the one or more predetermined information elements;
    send to the second device a standard-length request, the standard-length request including:
        a plurality of identifiers identifying a plurality of information elements not included in the generic wrapper information element, and
        a plurality of indicators, each indicator indicating whether a corresponding identified information element is to be sent to the apparatus if the corresponding identified information element is unchanged since previously sent to the apparatus; and
    receive from the second device a non-generic wrapper information element that includes at least an identified information element.

13. The apparatus of claim 12, wherein the network is an ad hoc wireless network.

14. The apparatus of claim 12, wherein the processor is further configured to receive one or more generic wrapper information elements, comprising the one or more predetermined information elements, according to one or more selection criteria, the one or more selection criteria identified by the second device.

15. An apparatus comprising:
means for receiving a beacon from a second device, the beacon associated with a network;

means for sending to the second device a short request, the short request associated with one or more predetermined information elements associated with the network;

means for receiving from the second device a generic wrapper information element that includes the one or more predetermined information elements;

means for sending to the second device a standard-length request, the standard-length request including:
a plurality of identifiers identifying at least a second information element not included in the generic wrapper information element, and
a plurality of indicators, each indicator indicating whether a corresponding identified information element is to be sent to the first device if the corresponding identified information element is unchanged since previously sent to the first device; and means for receiving from the second device a non-generic wrapper information element that includes at least an identified information element.

16. The apparatus of claim 15, wherein the network is an ad hoc wireless network.

* * * * *